M. F. FIELD.
FENDER.
APPLICATION FILED JULY 12, 1916.
1,256,781.
Patented Feb. 19, 1918.
5 SHEETS—SHEET 1.
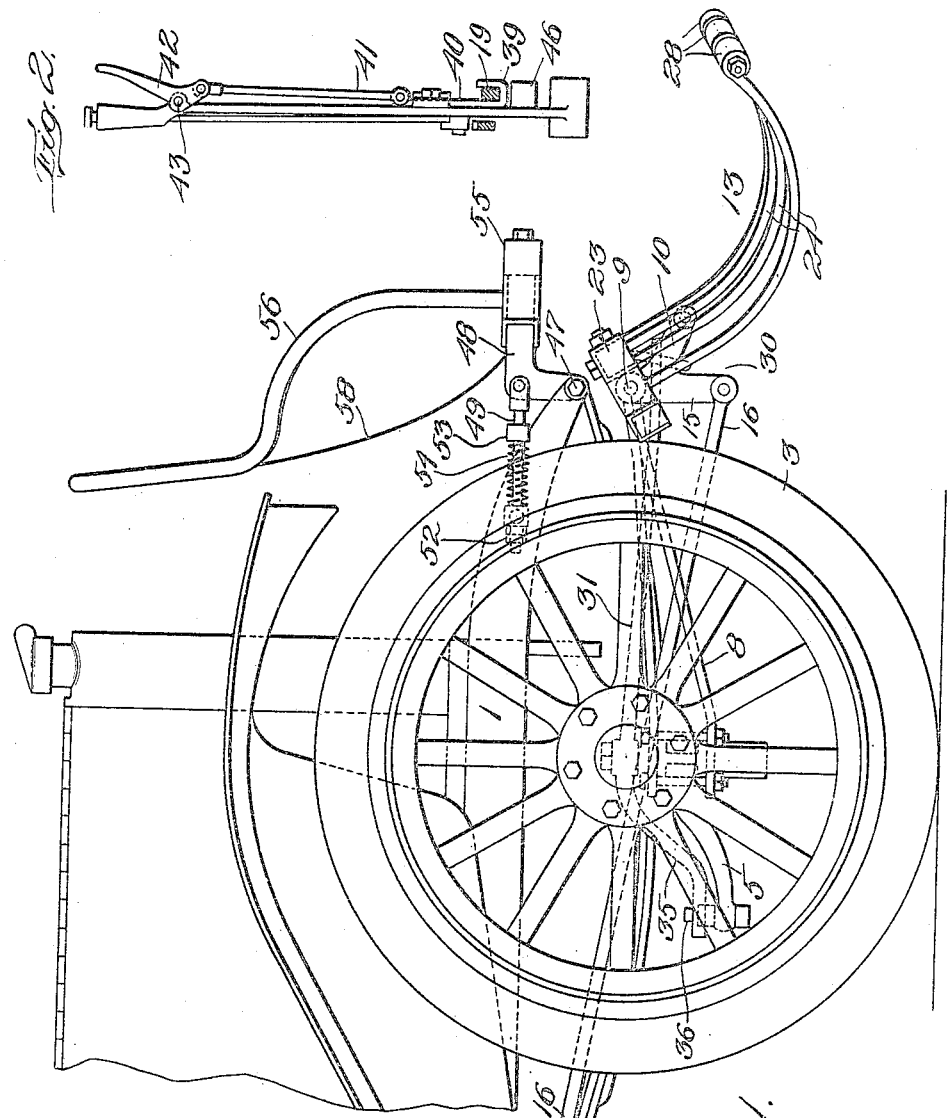
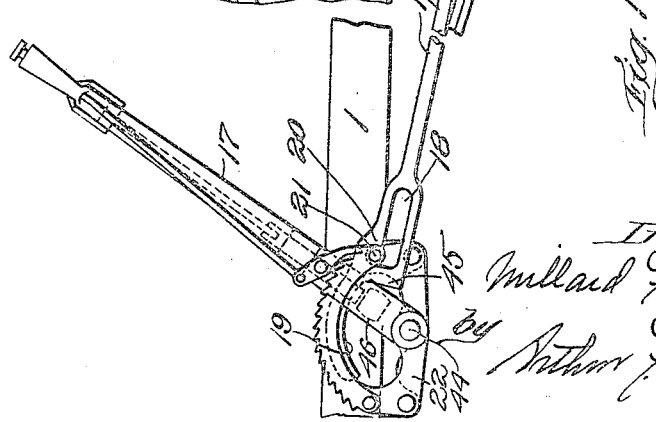
Inventor:
Millard F. Field
by Arthur F. Randell
Atty.

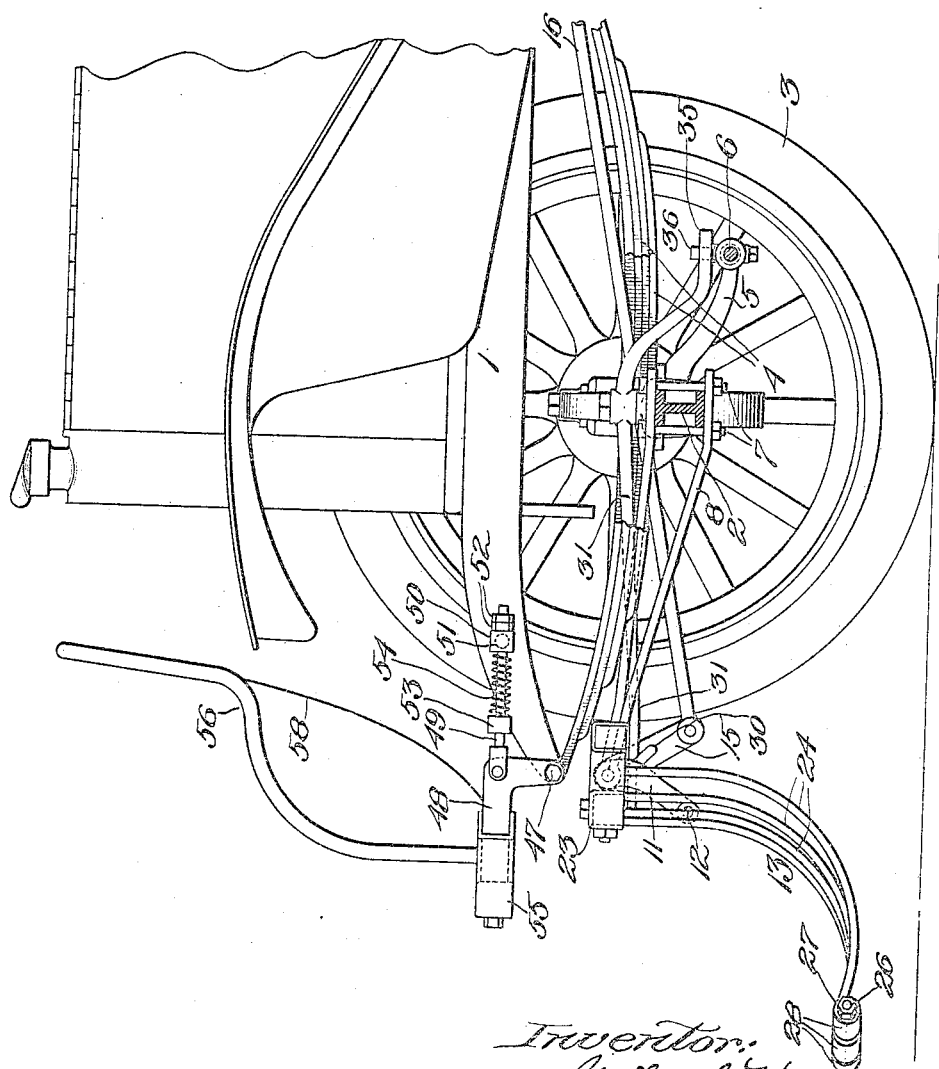

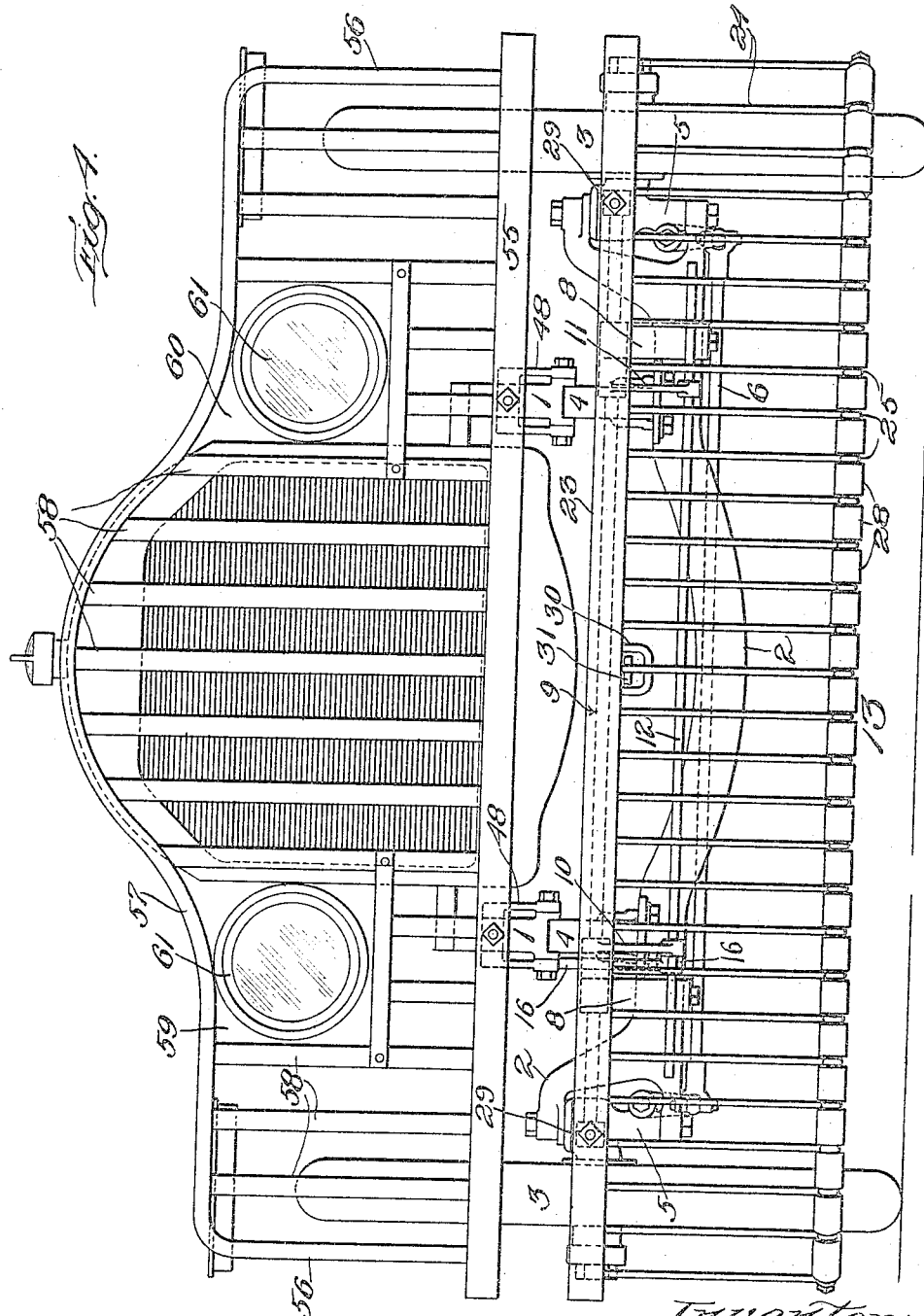

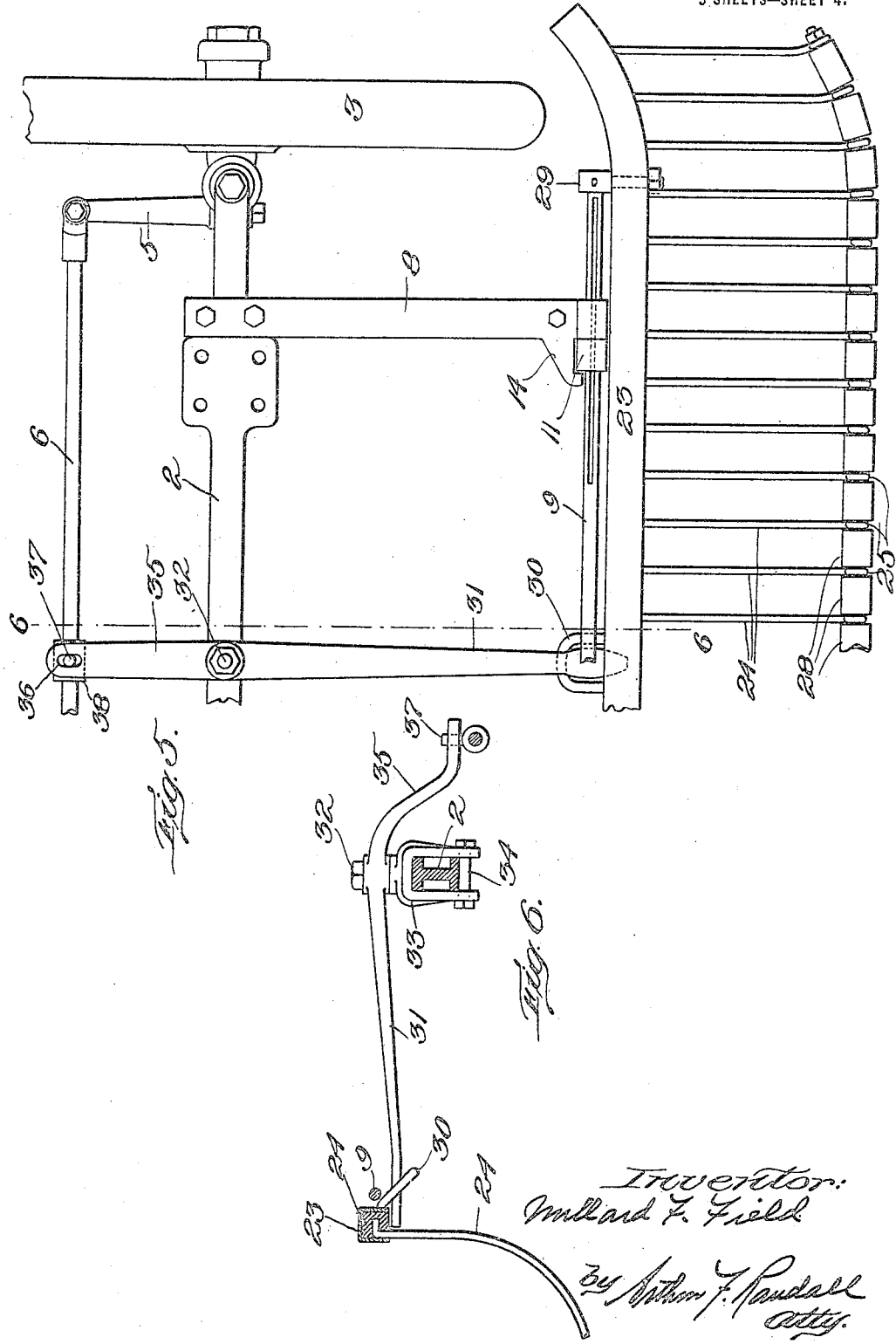

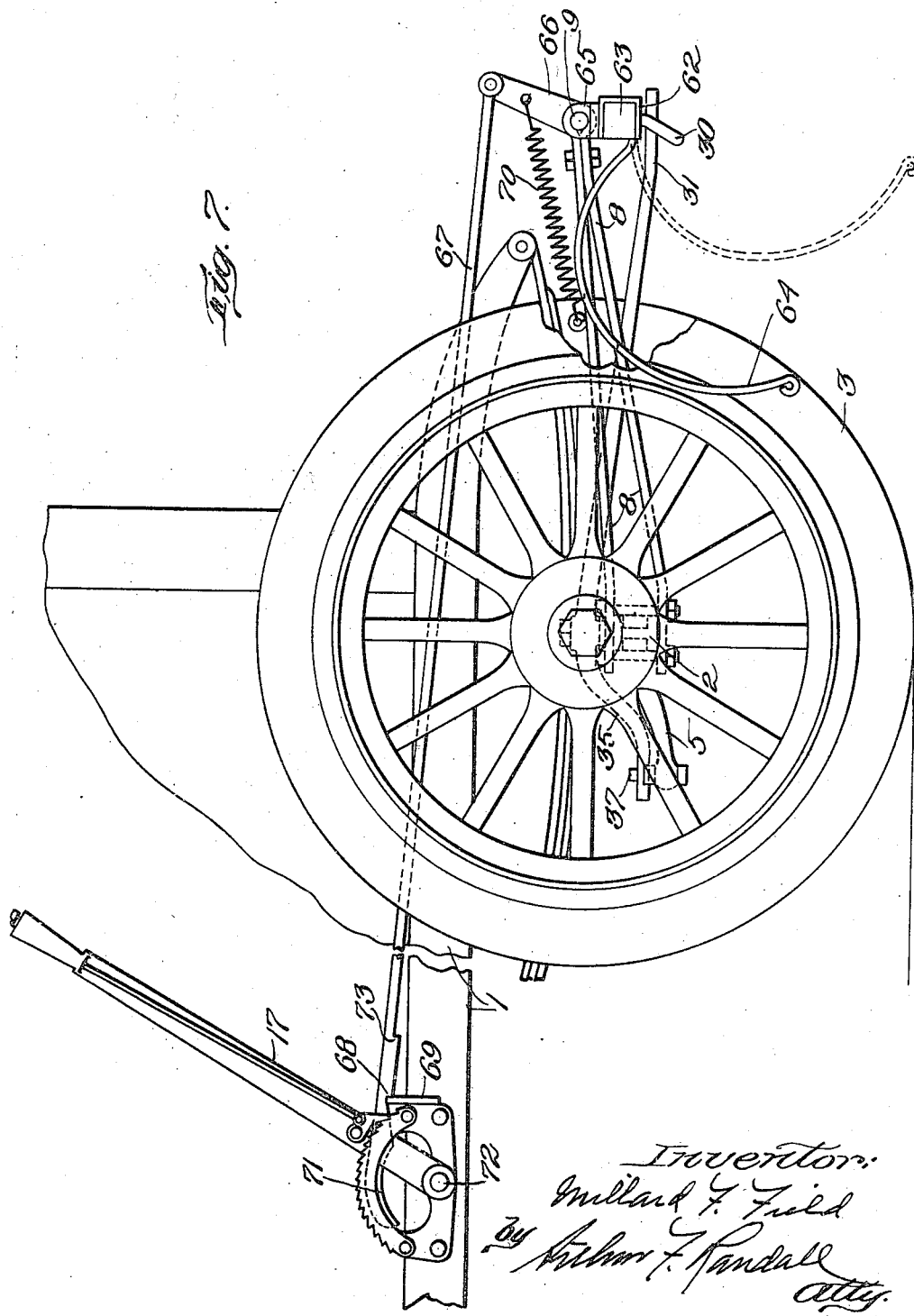

UNITED STATES PATENT OFFICE.

MILLARD F. FIELD, OF WINTHROP, MASSACHUSETTS.

FENDER.

1,256,781.  Specification of Letters Patent.  Patented Feb. 19, 1918.

Application filed July 12, 1916. Serial No. 108,933.

*To all whom it may concern:*

Be it known that I, MILLARD F. FIELD, a citizen of the United States, residing at Winthrop, in the county of Suffolk and State of Massachusetts, have invented certain new and useful Improvements in Fenders, of which the following is a specification.

My invention relates to fenders for vehicles and it has for its object to provide an improved fender that is particularly adapted for use on automobiles and the like. It is also the object of my invention to provide an improved motor propelled vehicle equipped with a fender arranged in front of the steering wheels thereof and shifted laterally with the steering wheels when the latter are swung one way or the other in making turns, whereby said fender is maintained in the paths of the wheels, or more nearly in the paths of said wheels than would be the case if the fender were not movable laterally. It is a further object of my invention to provide an improved motor propelled vehicle having a fender normally supported in an elevated position in front of the steering wheels of the vehicle but which can be lowered into an operative position nearer the roadway at the will of the driver of the car.

To these ends my invention consists of a fender for vehicles having the peculiar construction and mode of operation set forth in the following description, and the novel features of which are pointed out and defined in the claims at the close thereof.

The invention further consists in providing a motor propelled vehicle with a fender disposed in front of the steering wheels and supported with provision for lateral movement to a limited extent, said fender being connected with the steering apparatus of the vehicle so that it is shifted laterally with the steering wheels when the latter are swung in either direction. Another feature of my invention consists in providing a motor propelled vehicle with a fender mounted to move toward and from the road-bed and with means for normally holding said fender in elevated position, said means being under the control of the operator of the car and adapted to be operated by him so as to lower the fender at will.

Other features of my invention are hereinafter pointed out.

In the accompanying drawings:—

Figure 1 is a side elevation of a portion of the front end of an automobile embodying my invention.

Fig. 2 is a detail showing the emergency brake lever hereinafter referred to.

Fig. 3 is an elevation partly in section of the front end of the vehicle shown in Fig. 1 viewed from the opposite side and showing the fender in lowered position.

Fig. 4 is a front elevation of the vehicle shown in Figs. 1 and 2.

Fig. 5 is a plan view of a portion of the car and fender shown in Figs. 1 to 4, inclusive.

Fig. 6 is a section on line 6—6 of Fig. 5.

Fig. 7 shows a modification.

Having reference to the drawings, 1 represents the frame of an automobile, 2 the front axle, 3 the front wheels, 4 the springs connecting the frame and axles, 5 the steering knuckles of the latter and 6 the link connecting said steering knuckles, all constructed and operating as usual. One of the steering knuckles 5 is, of course, connected as usual with the steering post (not shown) within the body of the car.

Clamped rigidly to the axle 2 by means of bolts 7 is a pair of forwardly extending brackets 8 having eyes or bearings at their outer ends within which is mounted an endwise slidable and rotatable bar 9 on which is mounted two levers 10 and 11 carrying a transverse bar 12 which serves as a support for the fender 13. Both levers 10 and 11 are splined to bar 9 so that the bar can move endwise but not rotatively with relation to the levers, said levers being confined between brackets 8 and arms 14 projecting therefrom so that they cannot shift sidewise when bar 9 is moved endwise as described later.

The lever 10 is made with an arm 15 to which is pivotally connected the forward end of a rod 16, said rod extending rearward over axle 2 to the emergency brake lever 17 of the car, and being made, adjacent the latter, with a longitudinal slot 18 and curved arm 19. At its rear end the slot 18 is formed with a lateral branch or offset which provides a shoulder 20 that normally rests against a stud or bolt 21 carried by a bracket 22 secured to frame 1.

In this way the bar 12 and the fender 13 supported thereby are normally held in elevated positions with the bottom or lower portion of the latter on about the same level with the bottom of the axle 2 so as to clear ordinary elevations on the roadway.

The fender, proper, 13 comprises a top rail 23 which, as shown, may be made from a piece of channel iron having a wood filling 24, and this top rail 23 extends from a point beyond the outer side of one wheel across the vehicle to a point beyond the outer side of the other wheel. That is, it extends across the vehicle in front of both wheels 3 and its ends extend somewhat beyond the latter. The top rail 23 has secured to it the upper ends of a plurality of downwardly and forwardly curved springs 24 which may be made from round tempered wire, and at their lower forward ends these springs 24 are formed with eyes 25 embracing a rod 26 threaded at its ends and provided with end nuts 27. This rod 26 also carries a plurality of rubber rolls 28 alternating with the eyes of springs 24, said rolls serving as yielding buffers.

To the rear side of top rail 23 are secured two brackets 29, one near each end of said bar, each of said brackets being rigidly fastened to one end of the bar 9. The top rail 23 also carries a downwardly and rearwardly extending metal yoke 30 embracing the forward end of a lever 31 fulcrumed at 32 upon a bracket 33 that is clamped by means of bolts 34 to front axle 2.

The lever 31 is made with a rearwardly extending arm 35 formed with a slot 36 that is occupied by a pin 37 projecting from a collar 38 secured to connecting rod 6.

When the wheels 3 are swung in either direction the connecting rod 6 moves endwise with them and acts through lever 31 and yoke 30 to slide the fender 13 sidewise with the wheels, that is, in the same direction as the front sides of said wheels are swung and in this way the fender is automatically maintained in front of the wheels at all times.

The curved arm 19 at the rear end of rod 16 overlies a hook 39 provided at the lower end of a slide 40 mounted upon the side of the emergency brake lever 17. The upper end of slide 40 is connected by a link 41 with a thumb lever 42 pivoted at 43 to brake lever 17.

The arm 19 of rod 16 is formed with a curve that is concentric with the fulcrum 44 of brake lever 17 when rod 16 is in its normal position in engagement with stud 21 so that it will be clear that the emergency brake lever 17 may if desired, be operated to apply or unset the brakes independently of rod 16. It will also be clear that by pressing upon lever 42 with the thumb at the same time that lever 17 is drawn back to set the brakes the rear end of rod 16 will be lifted thus carrying the shoulder 20 out of engagement with stud 21 and permitting the fender 13 to fall down into its operative position shown in Fig. 3.

Near its rear end the bar 16 is provided with a second shoulder 45 and when the rear end of said bar 16 is lifted by means of slide 40 and shoulder 20 is disengaged from stud 21, the rearward movement of bar 16 carries shoulder 45 against a boss 46 projecting from the inner side of lever 17 and the weight of fender 13 as well as the impact and weight thereon of any object or person struck by it thus acts through shoulder 45 and boss 46 to assist the operator in applying the brakes.

The forward ends of the springs 4 are fastened, as usual, to the forward ends of the side bars of the frame 1 by means of bolts 47, one for each spring, and these bolts are also utilized to pivotally connect a pair of angular brackets 48 to said side-bars. Each bracket 48 has pivotally connected therewith the forward end of a link 49 that extends loosely through a block 50 pivoted at 51 to the adjacent side-bar of the frame and the rear end of each link 49 is threaded and provided with stop nuts 52. The link 49 carries a collar 53 between which and block 50 is arranged a spring 54 which serves to normally hold the link 49 at the limit of its forward movement with one of the nuts 52 against block 50. To the forward ends of the brackets 48 is secured a rail 55 extending transversely of the vehicle and of substantially the same size and shape as the rail 23. To this rail 55 is secured a frame consisting of two upright side bars 56 and a top cross-bar 57. To the top cross-bar 56 are secured the upper ends of a plurality of thin metal bands preferably made from tempered sheet metal strips. The lower ends of these bands which are shown at 58 are firmly secured to the rail 55 and are sufficiently slack to extend from the top rail 57 downwardly and forwardly on a curve which forms a comfortable seat.

When a person is thrown into the fender after the latter has been lowered into operative position the spring bars 24 will cushion his fall and prevent serious injury to his person through contact with the fender 13. In some cases the upper portion of the body of the person that is struck by the fender may be thrown into the seat made up of the parts 55, 56, 57 and 58 in which case the loose spring strips 58 will cushion his fall into that part of the fender.

Openings 59 and 60 are provided in the series of strips 58 opposite the headlights 61 of the car, so that the beams of light from said lamps are not obstructed.

In the form of my invention shown in Fig. 7 the fender comprises a rail 62 extending transversely across the machine in front of the front wheels 3 which rail may, as shown, be made from a piece of channel iron having a filling 63 of wood or the like. Projecting rearwardly from rail 62 is a series of tines 64 preferably made from spring wire.

On its top side the rail 62 is provided with brackets one of which is shown at 65 to which are fastened a transverse bar 9 that is supported with provision for endwise and rotary movement by a pair of brackets 8 secured to the front axle of the vehicle. The bar 9 has mounted thereon a lever arm 66 which is splined to said bar and held against sidewise movement with the latter in the same manner as the levers 10 and 11 of Figs. 1 and 2. To the lever arm 66 is pivotally connected the forward end of a rod 67 which extends from arm 66 rearwardly to the emergency brake lever 17 adjacent which said rod is formed with a shoulder 68 normally held against a stop 69 by a spring 70 connecting the arm 66 with one of the brackets 8. The rear end of the rod 67 terminates in a curved portion 71 which is concentric with the shaft 72 on which the brake lever 17 is mounted. The brake lever 17 is provided upon its inner side with a slide 40, link 41 and lever 42 as shown in Fig. 2, the hook 39 of this slide coöperating with the arm 71 of rod 67 in the same fashion as the hook 39 of the brake lever 17 of Figs. 1 and 2. The engagement of the shoulder 68 with the stop 69 causes the rod 67 to hold the arm 66 at the limit of its forward movement with the tines 64 of the fender in an elevated inoperative position at the rear of rail 62 and with the spring 70 under tension. When the operator lifts the rear end of the rod 67 by means of slide 40 of lever 17 the shoulder 68 is disengaged from the stop 69 and the spring 70 acts through the arm 66 to swing the rail 62 forward so that the tines 64 are swung downwardly and forwardly into operative position with their lower ends against the road bed, the resiliency of said tines allowing the latter to fit themselves to the road bed. When the rod 67 is thus shifted rearwardly a shoulder 73 provided on said rod near the rear end thereof is carried to the rear of the stop 69 and by engagement with the rear side of stop 69 locks said rod at the limit of its rearward movement and prevents the impact of a body against the fender from swinging the latter rearwardly on the bar 9. The parts are restored to their normal positions with shoulder 68 in front of stop 69 by manually lifting the rear end of rod 67 and forcing the latter forward until shoulder 68 drops down in front of stop 69.

The construction above described provides a light, strong and efficient fender in the form of an attachment adapted to be applied to any automobile of ordinary construction and when in position on the car the sidewise movements of the fender 13 not only maintain the latter in front of the wheels but the sidewise movement of the fender in the direction in which the vehicle is turned permits the latter to be turned in closer quarters than would be possible were the fender not movable sidewise with the wheels. The construction described also has the advantage that the fender is normally held elevated well above any ordinary elevations in the roadway but can be instantly dropped into its lower operative position at the will of the operator and in falling assists the operator in applying the emergency brakes.

What I claim is:

1. In a vehicle, the combination of a fender slidably supported by the front axle with provision for limited movement crosswise of the vehicle, and means connecting said fender with the steering apparatus for shifting said fender on its support when the vehicle is steered toward either side.

2. In a vehicle, the combination with the front axle, of a fender support projecting forwardly therefrom; a fender mounted on said support and slidable thereon crosswise of the vehicle, and means connecting said fender with the steering apparatus of the vehicle for sliding said fender on its support so as to maintain it in front of the wheels of said axle.

3. In a vehicle, the combination with the front axle, of a fender support carried by said axle; a fender mounted on said support so as to slide thereon crosswise of the vehicle and also swing thereon up and down; means connecting said fender with the steering apparatus of the vehicle for sliding said fender on said support to maintain it in front of the wheels of said axle, and means through which the operator controls the swinging movement of the fender on its support.

4. The combination of a vehicle; a fender mounted upon the front axle of said vehicle in front of the lower portion of the latter with provision for limited sidewise movement; means connecting said fender with the steering apparatus of the vehicle for shifting said fender sidewise when the vehicle is steered toward either side, and a fender mounted upon the frame of the vehicle in front of the upper portion of said vehicle comprising a transverse rail, an upright frame secured to said rail having a top cross-bar, and a transverse series of flexible bands secured at their upper ends to said top cross-bar and at their lower ends to said rail so as to form a seat.

In testimony whereof I have affixed my signature.

MILLARD F. FIELD.

Copies of this patent may be obtained for five cents each, by addressing the "Commissioner of Patents, Washington, D. C."